No. 779,052. PATENTED JAN. 3, 1905.
W. F. POPE.
IRRIGATING APPARATUS.
APPLICATION FILED OCT. 11, 1904.
2 SHEETS—SHEET 1.
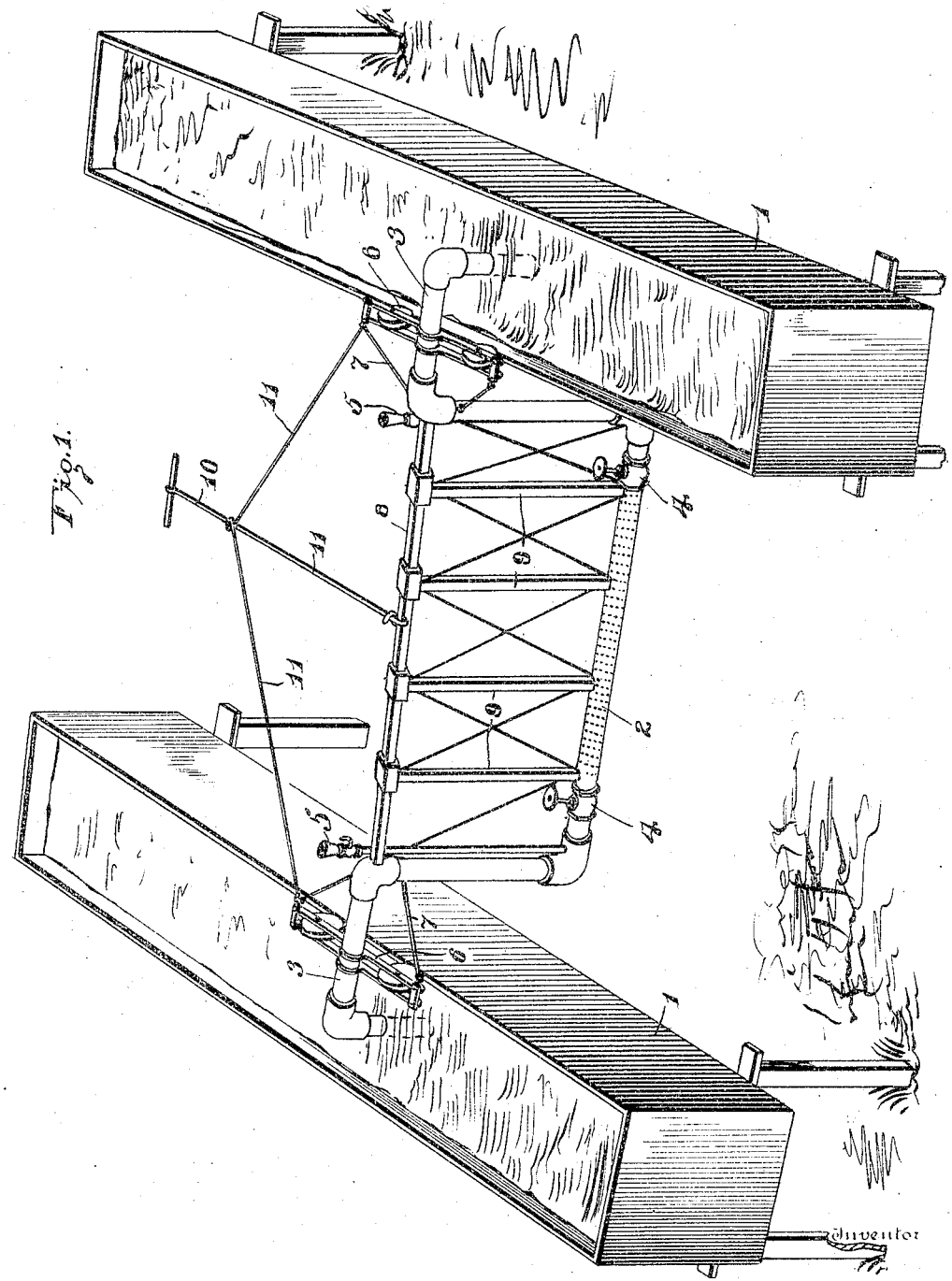

No. 779,052. PATENTED JAN. 3, 1905.
W. F. POPE.
IRRIGATING APPARATUS.
APPLICATION FILED OCT. 11, 1904.
2 SHEETS—SHEET 2.
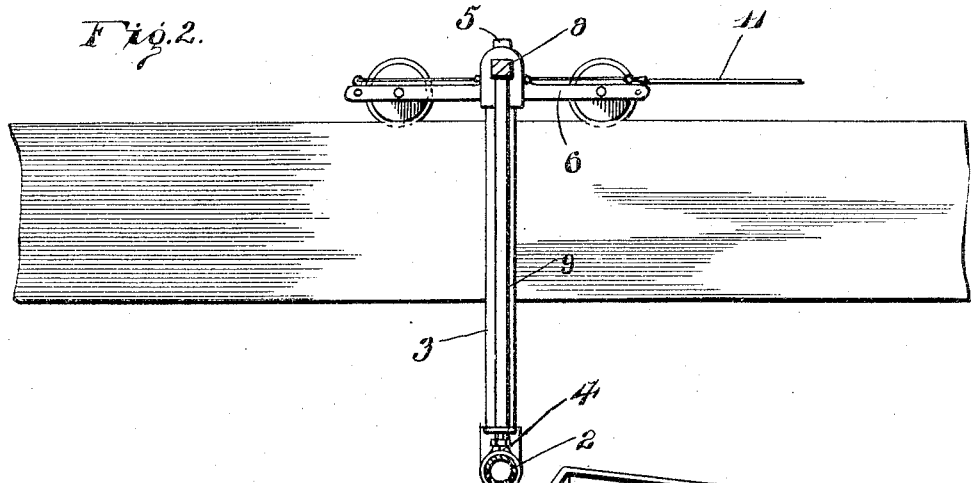
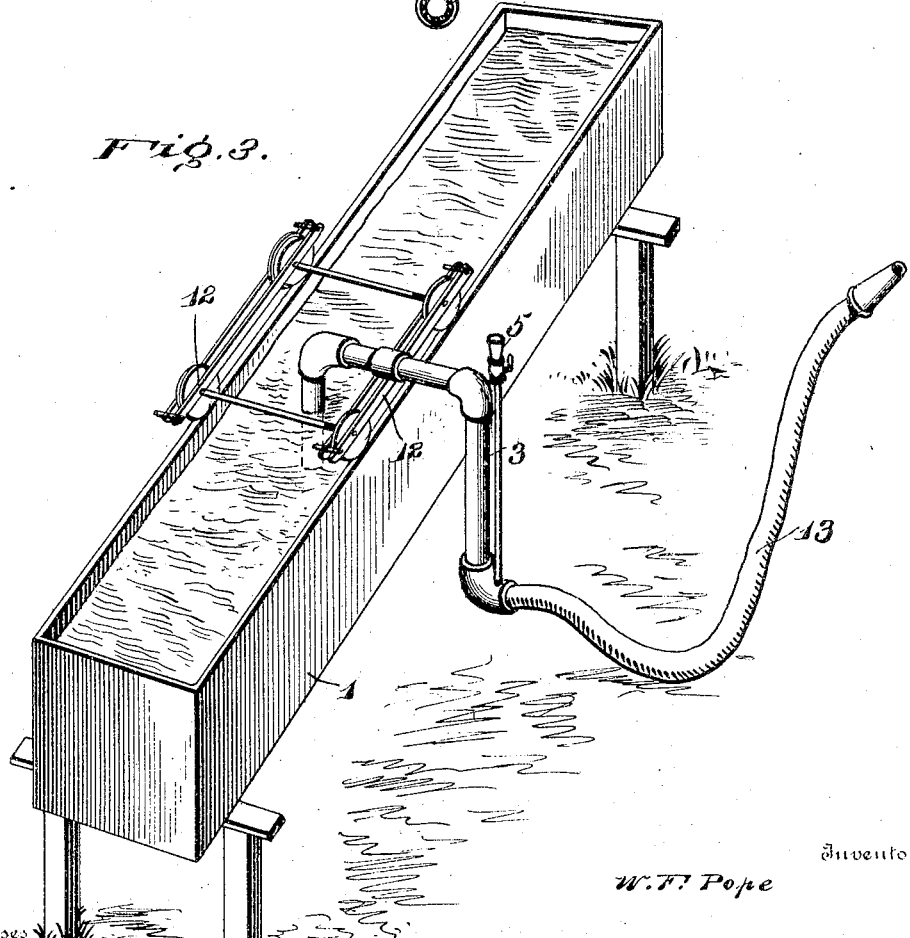
Witnesses
Inventor
W. F. Pope
By R. S. & A. B. Lacey, Attorneys No. 779,052.

Patented January 3, 1905.

UNITED STATES PATENT OFFICE.

WILLIAM F. POPE, OF WEST PALMBEACH, FLORIDA.

IRRIGATING APPARATUS.

SPECIFICATION forming part of Letters Patent No. 779,052, dated January 3, 1905.

Application filed October 11, 1904. Serial No. 228,083.

*To all whom it may concern:*

Be it known that I, WILLIAM F. POPE, a citizen of the United States, residing at West Palmbeach, in the county of Dade and State of Florida, have invented certain new and useful Improvements in Irrigating Apparatus, of which the following is a specification.

This invention provides a means for irrigating plants which will be free from expensive mechanism and obviate the use of long hose and which is susceptible of easy manipulation and not liable to derangement.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still some of the preferred embodiments are shown in the accompanying drawings, in which—

Figure 1 is a perspective view of an irrigating apparatus embodying the invention. Fig. 2 is a side view of a portion of a trough and the trolley supported thereby, showing the spray-pipe in section. Fig. 3 is a perspective view of a modification.

Corresponding and like parts are referred to in the following description and indicated in all the views of the drawings by the same reference characters.

The invention embodies a trough 1 of any determinate length and size, according to the ground to be irrigated. This trough may be of any capacity and construction and is preferably elevated to admit of supplying water to the sprayer by gravitative and siphonic action. In the preferable arrangement two troughs are provided and are spaced apart and disposed in parallel relation. The water for irrigating purposes may be supplied to the troughs by means of a windmill, water-ram, or other mechanism commonly employed for elevating and forcing water to the required point of use.

The sprayer embodies a pipe 2, which is perforated throughout its length to deliver the water in fine jets. A siphon 3 is connected with each end of the spray-pipe, and the short leg thereof dips into the water of the trough, whereas the long leg is coupled to the sprayer by means of an elbow or other suitable fitting. A valve 4, provided at each end of the sprayer, admits of controlling the delivery of water or of shutting off the supply from one or the other of the troughs in the event of a trough becoming emptied. A pipe 5 coöperates with each siphon to admit of supplying water thereto when it is required to start the water flowing through the siphon after the apparatus is otherwise in condition for operation. A trolley 6 is connected with each siphon and is mounted to run down a side of a trough or upon a suitable track, the purpose being to admit of moving the irrigator over the plants or ground to be watered. The trolley may be of any construction, and in the preferable form the siphon is arranged midway between the ends of the trolley, and braces 7 connect the end portions of the trolley with the siphon, so as to prevent binding or any relative play which would materially interfere with the free movement of the irrigator when moved backward or forward with reference to the troughs. A tie rod or bar 8 connects the upper ends of the siphon, and struts or hangers 9 connect said tie-rod with the spray-pipe 2. This construction prevents the spray-pipe from sagging intermediate of its ends and results in the provision of a rigid structure. A handle 10 is connected to the irrigator by draft rods or chains 11 and is centrally disposed to admit of the operator walking in a path intermediate of the troughs.

In the modification shown in Fig. 3 the trolley is in the form of a truck and comprises similar side members 12, connected transversely by axles or other coupling means. A hose-pipe 13 is connected to the lower end of the long leg of the siphon and is provided with a nozzle for distributing the water to the plants or ground to be irrigated. The trolley may be moved along the length of the trough either by pulling upon the hose-pipe or by applying force directly to the siphon.

From the foregoing it will be understood that the apparatus consists of a stationary trough containing a supply of water and a traveling irrigator, the latter embodying a siphon and a sprayer or distributer, the short leg of the siphon extending into the water of the trough and drawing a supply therefrom at any position of the irrigator. This construction obviates the use of a long line of the hose, which is expensive, and avoids the use of costly pumping machinery for elevating and delivering water to the required point of use when it is required to irrigate land.

Having thus described the invention, what is claimed as new is—

1. An irrigating appliance comprising a trough, a siphon mounted to travel along the trough and having its short leg extending therein, and a sprayer connected with the long leg of the siphon for distributing the water, substantially as set forth.

2. An irrigating appliance comprising parallel disposed troughs, a siphon for each trough having its short leg extending therein and mounted to travel lengthwise thereof, and a spray-pipe connected at its ends to the long legs of the siphon, substantially as set forth.

3. An irrigating appliance comprising corresponding troughs arranged in parallel relation, a siphon mounted to travel lengthwise of each trough and having its short leg extending therein, a perforated pipe connecting the long legs of the siphons, a valve between each end of the perforated pipe and the adjacent siphon to admit of regulating or connecting the supply, and means for supporting the siphons and minimizing the resistance to their movement, substantially as set forth.

4. An irrigating appliance comprising companion troughs, a trolley for each trough, a siphon supported by each trolley and having its short leg extended into the trough, a perforated pipe connecting the lower ends of the long legs of the siphons, a valve between each end of said perforated pipe and the adjacent siphon, a rod connecting the upper ends of the siphons, and connecting means between said rod and the perforated pipe, substantially as set forth.

In testimony whereof I affix my signature in presence of two witnesses.

WILLIAM F. POPE. [L. S.]

Witnesses:
H. B. SAUNDERS, Jr.,
C. P. METCALF.